July 9, 1929.   C. S. HALL   1,720,041
SAFETY PARACHUTE DEVICE FOR AIRCRAFT
Filed Sept. 7, 1926   2 Sheets-Sheet 1
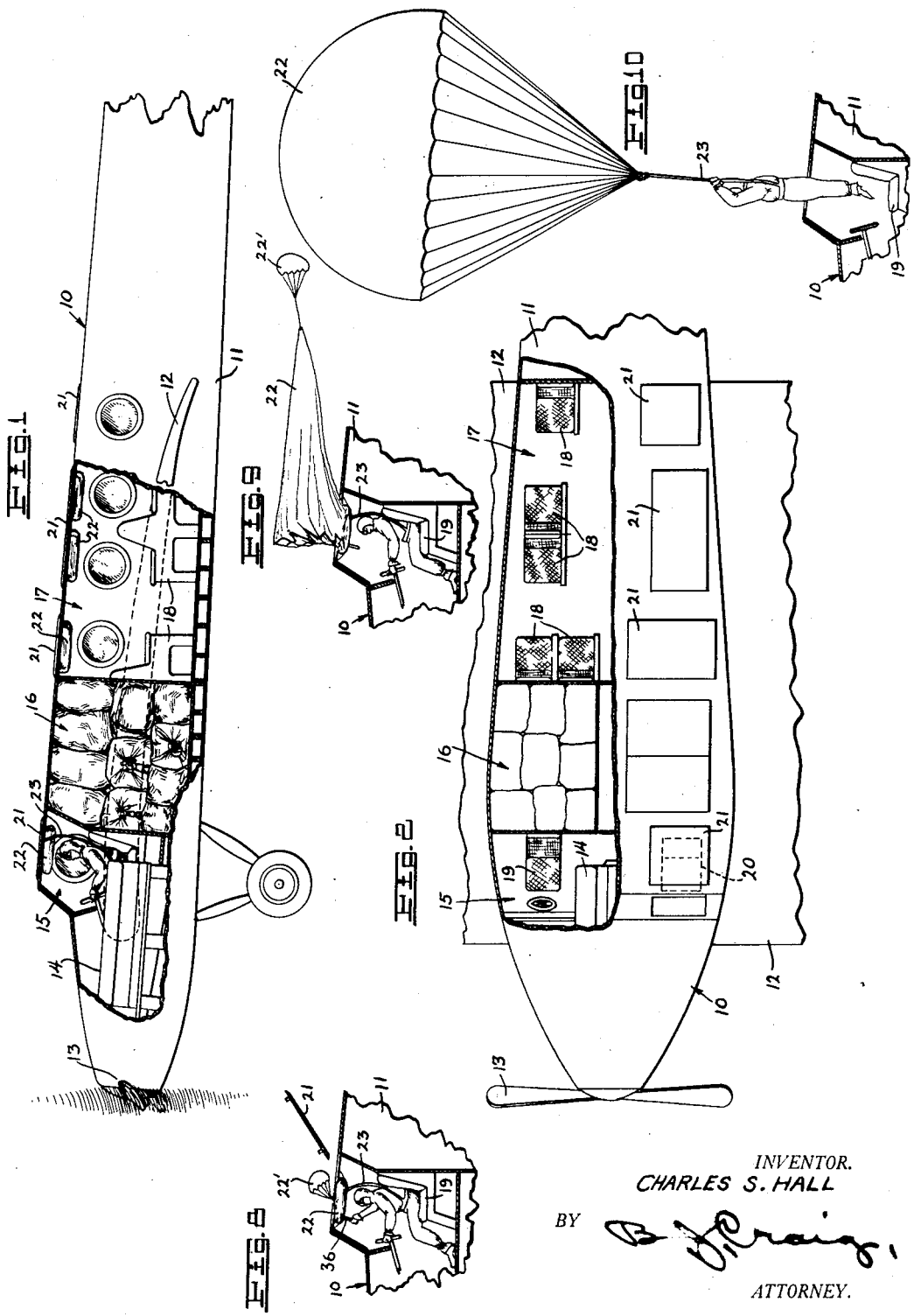
INVENTOR.
CHARLES S. HALL
BY
ATTORNEY.

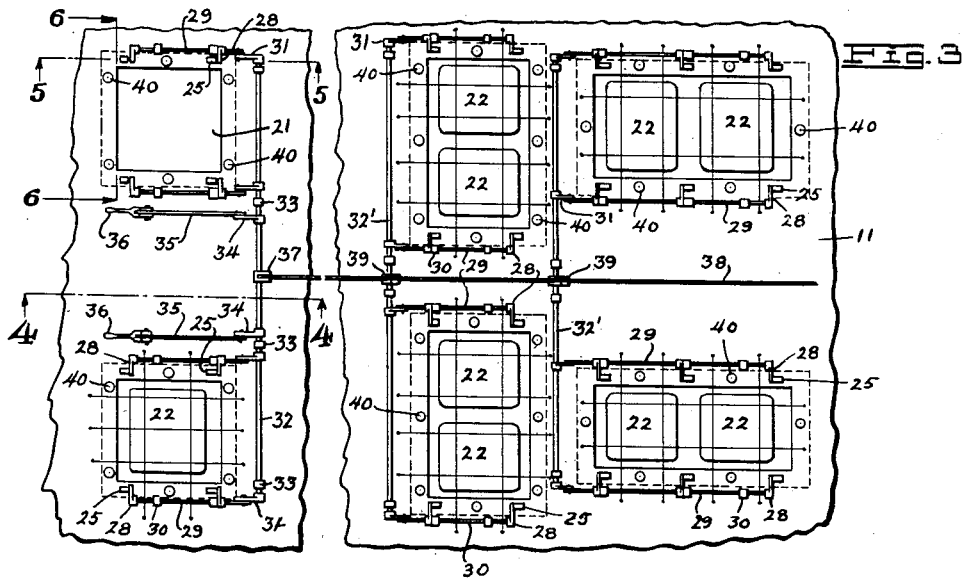
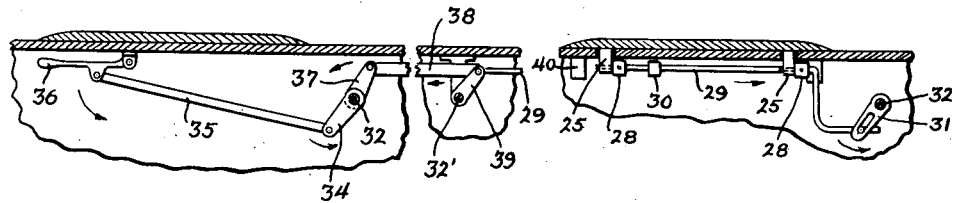
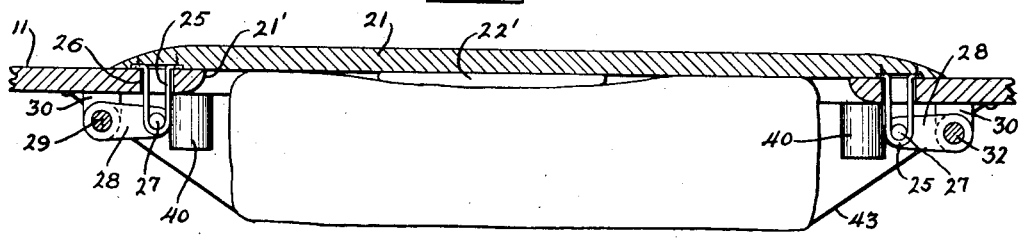
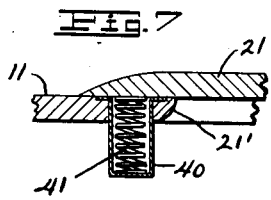
INVENTOR.
CHARLES S. HALL
ATTORNEY.

Patented July 9, 1929.

1,720,041

UNITED STATES PATENT OFFICE.

CHARLES S. HALL, OF OAKLAND, CALIFORNIA, ASSIGNOR TO HALL ENGINEERING & AIRCRAFT CONSTRUCTION COMPANY, A CORPORATION OF NEVADA.

SAFETY PARACHUTE DEVICE FOR AIRCRAFT.

Application filed September 7, 1926. Serial No. 133,912.

This invention relates to aircraft.

The general object of my invention is to provide an improved emergency exit and parachute release for aircraft.

A specific object of my invention is to provide means whereby a person in the body of an airplane, in case of accident while flying, may quickly launch a parachute and escape from the airplane.

Another object is to provide a positive parachute release and emergency exit for airplanes having bodies of the enclosed type.

Another object is to provide means whereby the operation of a single lever will release a number of parachutes located at different points in an aircraft.

Other objects of the invention will be apparent from the following description taken in connection with the accompanying drawings, wherein:

Fig. 1 is a fragmentary side elevation, partly in section, of a monoplane of the enclosed type;

Fig. 2 is a fragmentary top plan view of the same, partially in section;

Fig. 3 is a plan view of the under side of a portion of the top of the fuselage showing a number of the exit hatches and the operating mechanism;

Fig. 4 is a fragmentary section of the fuselage taken on line 4—4, Fig. 3 showing one of the pilot hatch release levers;

Fig. 5 is a view similar to Fig. 4 taken on line 5—5, Fig. 3 showing the bolt release mechanism of one of the hatches.

Fig. 6 is a fragmentary section of the fuselage top showing one of the hatches with a parachute suspended therebeneath;

Fig. 7 is a fragmentary section of the fuselage top and one of the hatches, showing one of the compression springs used to eject the hatch and Figs. 8, 9, and 10 are fragmentary sections illustrating the method of releasing the parachute and escaping from the airplane.

Referring now more specifically to the drawings by reference characters I have shown an aircraft 10, which is shown as the monoplane type, embodying the usual features such as a fuselage 11, wings 12, and a propeller 13, driven by an engine 14. As I have illustrated in the drawings the fuselage 11 is divided into a number of compartments such as the motor and pilot compartment 15 in the bow followed by a freight hold 16 just aft of which is the passenger cabin 17 provided with seats 18. In the top of the fuselage just above each of the passenger seats 18, the pilot seat 19 and the mechanic's seat 20, is a hatch and cover 21. Beneath each cover 21, is suspended a folded parachute 22 of any approved type and having a belt harness 23 for attaching to a person in the seat which may be directly below.

As illustrated in Fig. 3 and more clearly shown in detail in Figs. 5 and 6 each hatch cover has secured to its under side hasps 25 projecting through slots 26 in the fuselage top just outside the edge 21' of the hatch opening. The hasps 25 are engaged by slide bolts 27 held in arms 28 which are secured to a slide rod 29 mounted in bearings 30 and connecting to a crank arm 31 mounted on and secured to a rotatable rod 32 mounted in bearings 33, and on which is secured an arm 34. The arm 34 is connected by a link 35 to an operating hand lever 36 located on the under side of the fuselage top preferably adjacent to one side of the pilot's and mechanic's seat. Also secured to the rod 32 in the fore cabin, intermediate its length I show an arm 37, which is connected by an extended link 38 to arms 39 on each of several rods 32'. These arms 39 function to turn the rods 32', which are beneath the rod 38 to cause the hatch covers over the passengers' seats to be released. It will be understood that when the slide rods 29 over the operator's seat move aft the slide rods 29 over the passengers' seats move forward to simultaneously release all hatch fastenings.

Arranged in the top under the overlap of the hatch cover 21, and projecting downwardly through the top of the fuselage I show a plurality of spring housings 40 in which are compression springs 41 arranged in a compressed state and bearing against the bottom of the spring housing 40, and the under side of the hatch cover 21, for the purpose of forcing the hatch cover upwardly and holding the same rigidly against the bolts 27 and for effecting the hatch cover when the bolts 27 are withdrawn from the hasps 25.

From the foregoing description it will be seen that when the pilot or mechanic pulls the hand lever 36 downwardly as shown by the arrow in Fig. 4 the arm 34 will move as indicated by the arrow, in Fig. 4 and rotate the rod 32 which in turn rocks arms 37, and 38 in the direction of their respective arrows. As the rod 32 is rocked in the direction as indicated by the arrow in Fig. 5, it pulls the rod 29 to the right in Fig. 5, and the arms 28, which are mounted rods 29 are fastened thereto the bolts, are pulled out of engagement with the hasps 25, so that the hatch covers 21 are freed so that the springs 41 force the hatches up and out of engagement with the fuselage top.

On the rocking of the arm 37 in the direction of the arrow as shown in Fig. 4 the link 38 is pulled to the left, causing arms 39 on the rods 32' to rock and perform the releasing operations as on the passenger hatch covers to free the latter.

The parachute 22 is properly folded and suspended from the body by very light strings 43, directly below the hatch cover 21, as a result when the hatch covers have been released and ejected as previously described, the rush of air will open up small auxiliary parachutes 22', which are attached to the larger parachute 22, and pull them out through the hatch openings so that they will fill with air, and if the belt harness 23 is attached to a person, that person will be pulled through the hatch opening and clear of the plane by the main parachute 22.

Having thus described my invention, what I claim is:

1. An aircraft including a body having a top, bottom and sides, a plurality of compartments in said body including a passenger cabin and a pilot cabin, a plurality of seats in said passenger cabin, a seat in said pilot cabin, all of said seats being so arranged that the occupants thereof are disposed entirely within said body, a hatch opening in said top over each of said seats, closures for said openings, a parachute positioned in each of said openings and adapted to be attached to the occupants of said seats, said parachutes being suspended from said top by readily separable means.

2. An aircraft including a body having a top, bottom and sides, a seat in said body positioned so that an occupant thereof is entirely within said body, a hatch opening in said top over said seat, a closure for said opening, a parachute positioned in said opening and adapted to be attached to an occupant of said seat, said parachute being suspended from said top by a plurality of fragile supports, a latch mechanism supported by said top adapted to retain said closure in rigid relationship to said top and means adjacent said seat for operating said latch mechanism.

3. An aircraft including a body having a top, bottom and sides, a plurality of compartments in said body including a passenger cabin and a pilot cabin, a plurality of seats in said passenger cabin, a seat in said pilot cabin, all of said seats being so arranged that the occupants thereof are disposed entirely within said body, a hatch opening in said top over each of said seats, closures for said openings, a parachute positioned in said openings and adapted to be attached to the occupants of said seats, said parachute being suspended from said top by a plurality of fragile supports, a latch mechanism associated with each of said closures adapted to retain said closures in rigid relationship to said top, and means in said pilot cabin for simultaneously operating all of said latch mechanisms.

4. An aircraft comprising in combination, a hull, an enclosed passenger cabin and enclosed pilot cabin in said hull, a plurality of seats in said passenger cabin, a seat in said pilot cabin, a hatch opening in the top of said cabins directly above said seats, means to close said opening, releasable means to retain said closure means in rigid relation to said cabin top, a parachute positioned adjacent to each of said seats and having means thereon to be attached to an occupant of the adjacent seat, means operable by a person in one of said cabins for simultaneously releasing all of said closure retaining means.

5. In combination with an aircraft including a passenger cabin, a plurality of seats in said cabin, a hatch opening in the top of said cabin directly above each of said seats, closures for said openings, means to retain said closures in rigid relation to said cabin top, a parachute positioned in each of said openings and having means thereon adapted to be attached to an occupant of an adjacent seat, and means operable at a point remote from said cabin for actuating said closure retaining means.

In testimony whereof, I hereunto affix my signature.

CHARLES S. HALL.